United States Patent Office 2,774,740
Patented Dec. 18, 1956

2,774,740

GEL BREAKERS OF HEAVY METAL SOAP GELS

Sidney J. Magram, Baltimore, Md.

No Drawing. Application February 12, 1954,
Serial No. 410,052

19 Claims. (Cl. 252—326)

(Granted under Title 35, U. S. Code (1952), sec. 266)

The invention described herein may be manufactured and used by or for the Government of the United States of America for governmental purposes without the payment to me of any royalty thereon.

This invention relates to the breaking of colloidal dispersions and particularly to the breaking, or liquefying, of gels produced from liquid hydrocarbons and polyvalent metal soaps.

It is an object of this invention to break hydrocarbon-soap gels rapidly and effectively.

It is a further object to liquefy hydrocarbon-soap gels in a matter of minutes instead of the hours and days required by the known methods of breaking such gels.

It is a further object to break liquid hydrocarbon-polyvalent metal soap gels by the simple addition of well-known and commercially available agents.

The objects of this invention are obtained, and hydrocarbon-polyvalent metal soap gels are broken in a matter of minutes by the addition thereto of a small amount of an agent known to form chelates with polyvalent metals. The addition of the chelating agent rapidly breaks the heavy viscous, semi-solid gel to a thin, flowable liquid approximating the parent hydrocarbon in viscosity.

Liquid hydrocarbons, gelled by the addition of polyvalent metal soaps, particularly aluminum soaps, are used as lubricants, as fuels, as incendiaries and in oil-well drilling operations, as agents for the development of pressure in the boring. One difficulty encountered in the use of these gels, a difficulty which frequently prevents the use of certain very stable gels for particular applications, such as oil-well drilling, is that of breaking the gel when desired. For purposes of emptying or cleaning containers, instruments, mechanisms, equipment, and other objects to which the gels adhere, it is desirable to break the heavy, sticky gel to a thin free flowing liquid in order that it may be separated, by pouring, wiping, or blowing, etc., from solid materials. Suspended solid particles, and matter not soluble in the liquid hydrocarbon of which the gel is composed, can also be removed from dispersions in the gel, by the breaking of said gel.

Heavy gels are used in oil-well drilling to seal crevices in order that pressure may be developed to break through solid formations (rocks, etc.). After such use, it is required that the gel be broken to permit the free flow of fluids in the well. Many known gels, having otherwise desirable characteristics, have not been employed in oil-well drilling because of the difficulty of breaking the gel. My process permits the use of these gels since the gel may be broken with ease when required.

My process is particularly useful in the "Hydrafrac" method of improving oil-well production. This process is more fully described by Hassebrock in "World Oil," February 1, 1951, pages 133 to 138 and 148 of the "Production Section," and U. S. Patents 2,596,843, 2,596,844, and 2,652,370. In this process, oil-well formation permeability is increased by hydraulic fracturing of the formation. This is accomplished by pumping a viscous liquid (gel) containing a propping agent, usually a granular material such as sand, under high pressure into the boring and then breaking the viscous liquid (gel) down to a low viscosity liquid. The removal of the latter, after fracture of the formation, leaves the propping agent (sand) in the spaces produced by the fracture, thus materially increasing the permeability of the formation. In the past, as indicated in the above cited patents, emulsion breakers, such as oil-soluble amines and sulfonates, alkalies, strong acids and neutralized poly alkylated benzene sulfonates have been employed to break the viscous gels. My invention represents a great improvement in the step of gel breaking in the use of very small quantities of chelating agents which break the gels more rapidly and effectively. As is quite apparent, the mode of action of my process is entirely different from the use of emulsion breakers in the prior art. In my process, enough of the metal is removed by chemical action, from the soap in the gel structure to break the gel down into a thin liquid. This, controllable, chemical reaction, is far superior to the relatively slow and cumbersome emulsion-breaking techniques of the prior art, which require the handling of relatively large quantities of emulsion-breakers, and which tie up equipment for considerable periods of time. Many other and obvious uses of my gel breaking process will occur to the man skilled in the art.

My gel breaking process has particular commercial application in the breaking of the gels used in oil-well drilling. At the present time only certain soaps, such as those of the napalm type, can be used in this field, since other aluminum soap gels are too stable and cannot be broken down readily enough by the acid water normally used for gel breaking. My process will permit the use of all aluminum soap including those having superior gelling power, such as the aluminum soap of 2-ethyl hexoic acid, in the formation of hydrocarbon gels for oil-well drilling, since the gels can be quickly broken when required.

It is known that some gels composed of dispersed aluminum soaps in hydrocarbons, can be broken down by the introduction thereinto of polar materials such as water, or acid or alkaline aqueous solutions, phenols and some alcohols. In most cases, however, the time required to break the gel into a thin, free flowing liquid takes hours or days, depending upon the effectiveness of the gel breaker and its solubility in the hydrocarbon. In U. S. Patents 2,652,370, 2,596,844, and 2,596,843 such and other emulsion breakers have been disclosed for the breaking of gels employed in oil-well drilling.

According to my invention a compound of the class which is known to form chelates with polyvalent metal ions and which is soluble in the liquid hydrocarbon on the gel has been found to be vastly superior to any previously known gel-breaker because of the speed of gel breaking action and of the smaller amounts of material required to break the gel effectively.

I have found that chelating agents, which term includes compounds having the ability to form coordinate compounds with metals, will break down, in minutes, gels which require hours or days to be broken by the addition of conventional gel-breakers. I have found that the class of beta-di-oxo compounds (1,3 dicarbonyl compounds) including such enolizable compounds as acetoacetates, malonates, beta diketones, etc., are particularly effective and of this class the beta diketones are preferred. Acetyl acetone is my preferred species of gel-breaking agent of this class. I may also use other chelating agents such as 8-hydroxyquinoline and its derivatives as well as ortho-hydroxy aromatic aldehydes such as salicylaldehyde and its derivatives. Of all the chelating agents tested, 8-hydroxyquinoline is the most effective.

The class of chelating agents which are soluble in gasoline, or other liquid hydrocarbon which has been gelled, and which form a very stable compound with the metal of the soap used in the gel-formation, are effective. The metal soaps useful in gel formation are the soaps of polyvalent metals. Trivalent and quadrivalent metal soap-liquid hydrocarbon gels are most effectively broken by my process since gels of liquid hydrocarbon and divalent metal soaps require a somewhat longer time and a somewhat larger quantity of chelating agent for effective breaking.

Since the stability of the polyvalent metal-chelate formed, is greater than that the polyvalent metal soap-gel, under the conditions of my process, it is apparent that my process is operative in the breaking of the gels of any polyvalent metal soap. In particular I have found that beta di-ketones, 8-hydroxy-quinoline and derivatives thereof, salicylaldehyde and derivatives thereof and ethyl acetoacetate will quickly break down into thin, free flowing liquids, gels made from normally liquid hydrocarbon and any aluminum soap, regardless of the type of soap or the concentration of the soap. Gels of gasoline and (1) aluminum salts of oleic, naphthenic and cocoanut fatty acids ("Napalm"), (2) aluminum salts of 2-ethyl hexoic acid and (3) aluminum salts of mixed fatty acids containing from five to seven carbon atoms, are quickly broken down in minutes to free flowing thin liquids by the addition of acetylacetone, 8-hydroxy-quinoline, salicylaldehyde or ethyl acetoacetate. The chelating agent quickly combines with the aluminum of the soaps forming a stable chelate and causing the break down of the gel structure.

The quantity of chelating agent to be employed is very small in comparison with the total quantity of gel since the amount of chelating agent is determined by the amount of polyvalent metal which is present in the gel, and the latter amount is comparatively small. The chelating agent is employed in proportion to the equivalent weight of polyvalent metal present in the soap which forms the liquid hydrocarbon gel. The chelating agent need not be used in the exact proportions required to produce a chelate with all of the polyvalent metal ion, since the gel structure will be broken in the presence of much smaller quantities of the chelating agent. In general from about .01% to about .5% of the chelating agent is adequate for complete gel breakdown. Where the agent and the gel cannot be mixed, larger quantities of chelating agent may be employed to accelerate gel breakdown.

In trials wherein one half of one per cent of acetyl acetone was added to 6% napalm gels and to 4% aluminum 2-ethyl-hexoate gels with gasoline, the gels were broken down to thin free flowing liquids, approximating the viscosity of the original gasoline, in a matter of minutes. The time required to break the gel and the optimum quantity of chelating agent is dependent upon the strength of the gel, the stability of the chelate formed, and particularly upon the contact of the chelating agent with all proportions of the gel. Thorough mixing greatly decreases the time required to break down a given gel. The effective quantity of chelating agent also varies somewhat with the mixing. Weaker gels, such as those produced with aluminum stearate are broken in a minute or less while very strong, stable, gels, such as those containing aluminum 2-ethyl hexoate, require somewhat more time. Without mixing, the break down of the gel is slower but occurs continuously as the chelating agent permeates the gel; that portion of the gel in contact with the chelating agent quickly breaks down and the agent then progressively contacts the adjacent areas of the gel until the entire gel is broken down. This process is far more rapid than the prior art processes of gel breaking wherein emulsion breakers are employed, and much smaller quantities of gel-breaker are required to be handled.

It can be seen from the above, that, while a very small proportion (less than 1% of the gel) of chelating agent is required, the optimum quantity is dependent upon the strength of the gel, the stability of the chelate, and upon the thoroughness of mixing. The use of a large excess of chelating agent does no harm but is not economical. The time required to break down a given gel is also dependent upon the mixing, the strength of the gel and the stability of the chelate. The point of break down of the gel is easily determined (visually, etc.) and it is a simple matter for the operator to determine when the process is complete.

While I do not wish to be limited to the proportions and conditions set forth below, specific embodiments of my invention are described in the following examples:
(All percentages are by weight.)

*Example I*

To a gasoline gel, containing 3% of aluminum 2-ethyl hexoate, as the gelling agent, was added .01% of acetylacetone. On mixing, the gel broke down to a thick, flowable liquid in two minutes and continued to thin down on further mixing.

*Example II*

Example I was repeated with the introduction of .4% acetylacetone and the gel broke to a thin liquid, having the viscosity of the original gasoline, in two minutes.

*Example III*

To a one foot thick layer of a 3% aluminum 2-ethyl hexoate gasoline gel, was added .4% of acetylacetone, without stirring. The gel progressively broke down from the point of original contact with the acetylacetone, the entire foot-thick layer being broken down after three hours standing.

*Example IV*

To a 6% aluminum stearate-gasoline gel was added .4% of 8-hydroxyquinoline (the solid compound was dissolved in the minimum quantity of benzene) and on stirring the gel was completely broken down to a thin flowable liquid in less than one minute.

*Examples V and VI*

Example IV was repeated adding the .4% of 8-hydroxyquinoline to a 6% napalm (mixed aluminum salts of oleic, naphthenic and cocoanut oil fatty acids)-gasoline gel and to a 4% aluminum 2-ethyl hexoate-gasoline gel and in each instance on stirring for less than one minute, the gel was broken down to a thin, free flowing liquid having the approximate viscosity of the original gasoline.

*Examples VII and VIII and IX*

Examples IV, V and VI were repeated adding .4% of acetylacetone to (1) 6% aluminum stearate-gasoline gel, (2) 6% napalm-gasoline gel and (3) 4% aluminum 2-ethyl hexoate-gasoline gel. The first two gels were broken down in less than one minute and the aluminum 2-ethyl hexoate gel was broken down in one minute.

*Examples X, XI, and XII*

Employing the same three gels as above, there was added, with stirring, .4% of ethyl acetoacetate. The aluminimum stearate-and the napalm-gasoline gels, were broken down in five minutes while the aluminum 2-ethyl hexoate gel was completely broken down in twenty minutes.

*Example XIII*

To a 4% aluminum-2-ethyl hexoate-gasoline gel, there was added, while stirring, .4% of salicylaldehyde. The gel was broken down in thirty minutes.

It is apparent from the above that 8-hydroxyquinoline is the most powerful gel-breaker which I have employed. All chelating agents which will form stable compounds with the metal of the soap in the gel (aluminum) are operative and the more stable the metal chelate formed, the more powerful will be the gel-breaking action of the chelating agent. Less agent will be required and faster gel-breaking results from the use of more powerful chelating agents. Where a powerful chelating agent is not soluble in the hydrocarbon of the gel, the agent may nevertheless be employed by dissolving it in a solvent and dispersing the solution in the gel.

I claim:

1. A process for the breaking of gels composed of a polyvalent metal soap and a liquid hydrocarbon which comprises adding to said gel a chelating agent of the group consisting of beta-di-oxo compounds, 8-hydroxyquinoline, and orthohydroxy aromatic aldehydes in a quantity sufficient to liquefy the gel.

2. The process of claim 1 wherein the polyvalent metal soap is an aluminum soap.

3. The process of claim 2 wherein the soap is napalm.

4. The process of claim 2 wherein the soap is aluminum 2-ethyl-hexoate.

5. The process of claim 2 wherein the hydrocarbon is gasoline.

6. The process of claim 2 wherein the chelating agent is a beta-di-oxo compound.

7. The process of claim 6 wherein the beta di-oxo compound is a beta di-ketone.

8. The process of claim 7 wherein the beta di-ketone is acetylacetone.

9. The process of claim 6 wherein the beta di-oxo compound is ethyl acetoacetate.

10. The process of claim 2 wherein the chelating agent is 8-hydroxyquinoline.

11. The process of claim 2 wherein the chelating agent is salicylaldehyde.

12. The process for the breaking of an aluminum soap-gasoline gel, which comprises treating said gel with acetylacetone to liquefy said gel.

13. A process for the breaking of an aluminum soap-gasoline gel, which comprises treating said gel with 8-hydroxyquinoline to liquefy said gel.

14. In the process for increasing oil-well formation permeability by the hydraulic fracturing of the formation by the introduction under high pressure of a viscous gel of a polyvalent metal soap and a liquid hydrocarbon containing a propping agent, the improvement which comprises the breaking down of the viscous gel to a low viscosity liquid by the addition to said gel of a small quantity of a chelating agent of the group consisting of beta-di-oxo compounds, 8-hydroxyquinoline, and orthohydroxy aromatic aldehydes.

15. The process of claim 14 wherein the chelating agent is a 1,3-dicarbonyl compound.

16. The process of claim 15 wherein the 1,3-dicarbonyl compound is a beta di-ketone.

17. The process of claim 16 wherein the beta di-ketone is acetylacetone.

18. The process of claim 14 wherein the chelating agent is salicylaldehyde.

19. The process of claim 14 wherein the chelating agent is 8-hydroxyquinoline.

References Cited in the file of this patent

UNITED STATES PATENTS

| | | |
|---|---|---|
| 2,596,843 | Farris | May 13, 1952 |
| 2,596,844 | Clark | May 13, 1952 |
| 2,610,952 | Fischer et al. | Sept. 16, 1952 |
| 2,652,370 | Wisherd | Sept. 1, 1953 |